United States Patent [19]

Arrey

[11] 3,716,268
[45] Feb. 13, 1973

[54] LONGITUDINAL AND LATERAL RETAINER AND GUIDE ASSEMBLY FOR CONTAINERS ON A VEHICLE BED

[75] Inventor: Kelly J. Arrey, Montreal, Quebec, Canada

[73] Assignee: Canadian National Railway Company, Montreal, Quebec, Canada

[22] Filed: March 23, 1971

[21] Appl. No.: 127,160

[30] Foreign Application Priority Data

Feb. 4, 1971 Canada..................................104514

[52] U.S. Cl..............296/35 A, 105/366 D, 280/143
[51] Int. Cl. ..............................................B60p 7/10
[58] Field of Search........296/35 A; 280/143, DIG. 8; 105/366 R, 366 A, 366 D; 248/119 R

[56] References Cited

UNITED STATES PATENTS

| | | | |
|---|---|---|---|
| 3,626,868 | 12/1971 | Mowatt Larssen | 105/366 A |
| 1,988,944 | 1/1935 | Hankins et al. | 105/366 D |
| 2,002,439 | 5/1935 | Owens | 105/366 D |
| 3,219,218 | 11/1965 | Hand | 296/35 A X |
| 3,439,822 | 4/1969 | Korodi | 280/DIG. 8 |

Primary Examiner—Leo Friaglia
Assistant Examiner—Leslie J. Paperner
Attorney—Fetherstonhaugh & Co.

[57] ABSTRACT

A bolster extending tranversely on a flat vehicle bed is provided at one side with an upstanding flange which engages the end of a shipping container resting on the bolster, so as to prevent movement of the container longitudinally and transversely of the bed. A vertical side plate on each end portion of the bolster projects upwardly to engage a side of the container and prevent movement thereof transversely of the bed. The side plate has an upwardly and outwardly slanting upper portion, and an upwardly and outwardly slanting end plate is secured to the bolster above the flange. The slanted upper portion of the side plate and the slanted end plate provide sloping guides for a container which is loaded from overhead onto the bolster.

1 Claim, 5 Drawing Figures

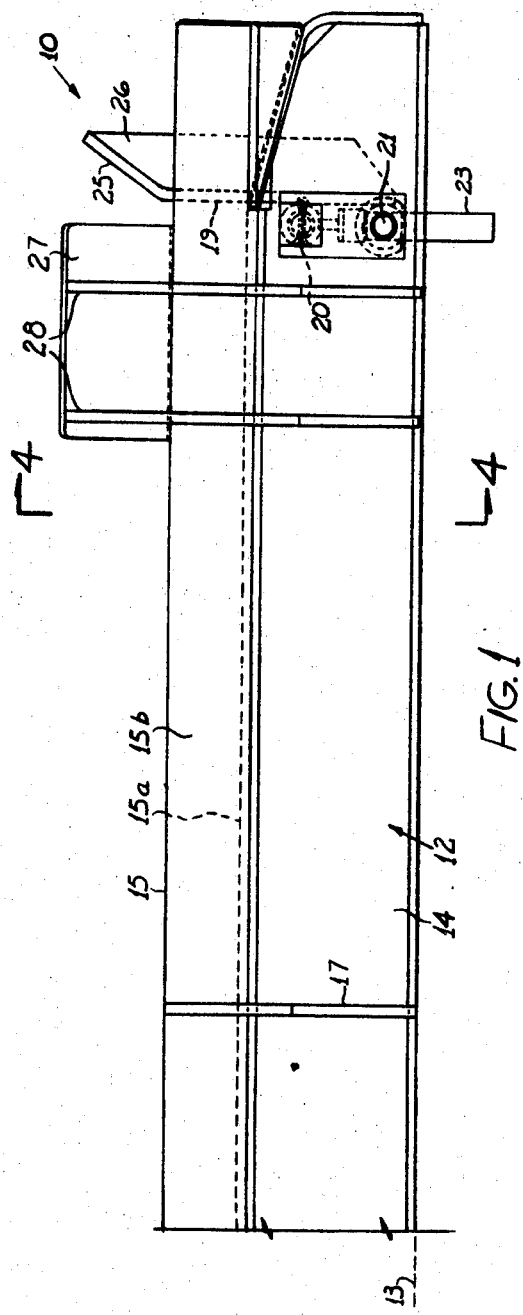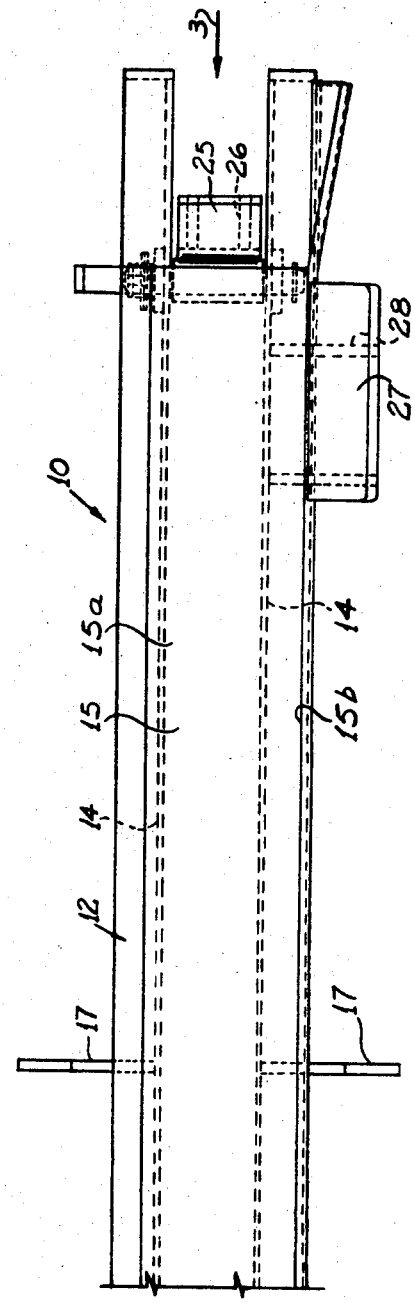

INVENTOR
Kelly J. ARREY

LONGITUDINAL AND LATERAL RETAINER AND GUIDE ASSEMBLY FOR CONTAINERS ON A VEHICLE BED

This invention relates to new and useful improvements in devices for retaining shipping containers in position on flat beds of vehicles such as railroad cars, highway semi-trailers, and the like.

It has become customary to ship freight, either by road or by rail, in rectangular containers of standardized sizes, such containers being carried on flat beds of the transporting vehicles. In some instances the length of a single container is approximately the same as that of the vehicle bed, and the ends of the bed are provided with transversely extending bolsters on which the container is supported. In other instances two or more containers are loaded in tandem on the same vehicle bed, in which event additional bolsters are provided intermediate the ends of the bed to support such plural containers.

In any event, it is necessary to provide the bolsters with some means for retaining the container or containers in proper position thereon, that is, against possible shifting movement longitudinally and/or transversely of the vehicle bed. In conventional practice, such means usually include an upstanding flange provided along one side of a bolster and projecting above the surface of the bolster on which a container is supported, the projecting flange engaging an end of the container and preventing movement of the container longitudinally of the vehicle bed. Also, such means include a locking device provided at each end of the bolster and projecting upwardly therefrom to engage the side of the container, thus preventing movement of the container transversely of the vehicle bed. In many instances the locking device is pivotally mounted and retractable below the container supporting surface of the bolster so that the container may be loaded on or unloaded off the vehicle bed in a lateral direction, as for example, laterally from a semi-trailer to a railroad car and vice versa, or from a loading platform onto a trailer or car, and the like. A typical example of means for handling and holding containers with side-transfer facilities appears in Canadian patent No. 804,422 issued Jan. 21, 1969.

However, it is becoming increasingly desirable to load flat-bedded vehicles from overhead rather than laterally, as for example by a crane from the hold of a ship or from a loading dock onto a semi-trailer or a railroad car, or from a trailer onto a railroad car and vice versa. Under such circumstances the shipping container, suspended from a crane, is movable in all directions, and considerable effort must be made to assure that when the container is lowered, it is properly aligned with the vehicle bed, both longitudinally and transversely, so that it becomes properly seated on the bolsters within the confines of the bolster flanges and locking devices which serve to prevent the container from shifting during transit.

The principal object of the invention is to provide improved means for retaining a container in proper position on a vehicle bed so as to prevent the container from longitudinal and/or lateral shifting, such retaining means being combined with guide means particularly designed for overhead loading, so that when the container is being lowered to the vehicle bed, it is effectively guided in its lowering movement and becomes properly aligned with respect to the vehicle bed for seating on the bolsters within confines of the retaining means.

Although the invention is especially intended for use in overhead loading, its arrangement is such that conventional side loading is also possible, as for example in the aforementioned patent.

With the foregoing more important object and features in view and such other objects and features which will become apparent as this specification proceeds, the invention will be understood from the following description taken in conjunction with the accompanying drawings, wherein like characters of reference are used to designate like parts, and wherein:

FIG. 1 is a fragmentary end elevational view of a bolster with the retainer and guide assembly of the invention on one end portion thereof;

FIG. 2 is a fragmentary top plan view of the subject shown in FIG. 1;

Figure 3:
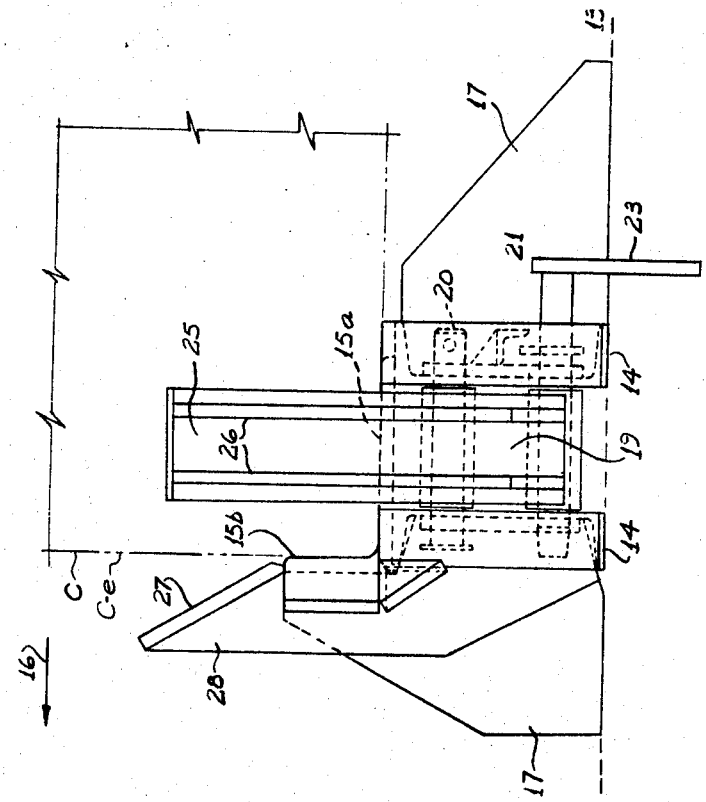
FIG. 3 is a side elevational view, taken in the direction of the arrow 3 in FIG. 2.

Referring now to the accompanying drawings in detail, the retainer and guide assembly of the invention is designated generally by the reference numeral 10, the same comprising an elongated bolster 12 which extends transversely of and is firmly secured to the flat bed 13 of a semi-trailer, railroad car, or the like. Two such bolsters are provided, one at each end of the vehicle bed, and additional bolsters may be provided intermediate the ends of the bed if the bed is to accommodate two or more containers in tandem. It may be also noted at this point that although the drawings show the retainer and guide means only at one end portion of the bolster, such means are also provided at the other end portion, so that in the instance of two bolsters spaced longitudinally of the vehicle bed and retainer and guide means on both end portions of each bolster, such means are present at all four corners of a shipping container C which usually is of rectangular form.

It may be further noted that although the bolster 12 is elongated transversely of the vehicle bed 13, for most part the term "longitudinally" is used herein with reference to the end-to-end dimension of the vehicle bed, as distinguished from the transverse elongation of the bolster. However, in a few instances, the term "longitudinal" is applicable to the bolster with reference to one of its sides.

Figure 4:
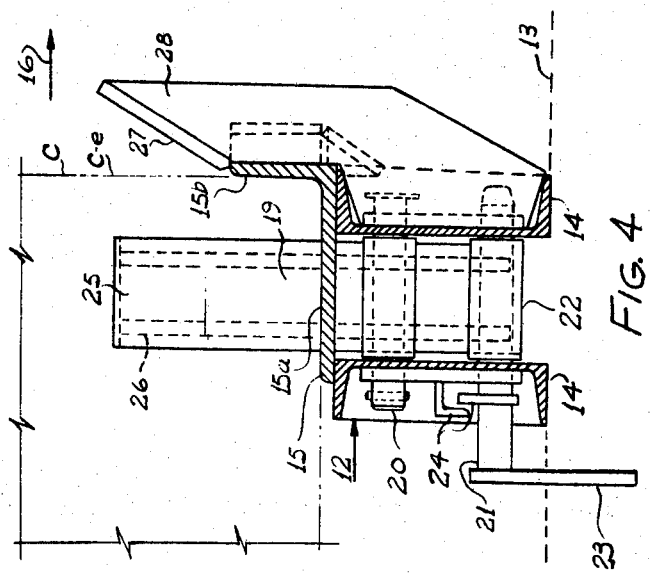
FIG. 4 is a sectional detail, taken substantially in the plane of the line 4-4 in FIG. 1.

The bolster 12 may be of any suitable conventional construction, as for example that which includes a pair of spaced channels 14 which are secured to the vehicle bed 13 and are spanned at the top thereof by an angle bar 15. The horizontal flange 15a of the latter provides a supporting surface for the container C, while its vertical flange 15b projects above the supporting surface to engage one end C-e of the container as shown in FIGS. 3 and 4. This prevents the container from shifting longitudinally of the vehicle bed, as in the direction 16 in those Figures. Suitable gussets 17 may be secured to the channels 14 as shown in FIGS. 1 and 2 to assist in securing the bolster 12 to the vehicle bed 13. Means to prevent shifting of the container transversely of the vehicle bed, that is, in the direction of the arrow 18 in FIG. 5, comprise a vertical plate, herein referred to as the side plate 19, which is disposed in one end portion of the bolster 12 and projects upwardly therefrom above the container supporting surface 15a in order to engage a side C-s of the container C, as will be apparent from FIGS. 1 and 5. To facilitate side loading and unloading of the container in the conventional manner, the side plate 19 is pivotally mounted on a horizontal pivot pin 20 which extends between the two bolster channels 14. This pivotal mounting permits the side plate 19 to be swung outwardly and downwardly below the container supporting surface 15a to its lowered position indicated by the dotted lines 19a in FIG. 5, thus affording clearance necessary for side loading and unloading of the container. The side plate 19 is locked in its raised, vertical position by a locking pin 21 which is insertable in a bushing 22 secured to the side plate and is receivable in aligned apertures formed in the channels 14, all this being of conventional construction as shown in the aforementioned patent. Also as shown in the patent, the locking pin 21 may be provided with a handle 23 and with means 24 for removably retaining the same in its locking position.

While providing the pivotal mounting of the side plate 19 as a conventional facility for side loading and unloading of containers, the invention is primarily concerned with overhead loading when the side plate 19 is in its raised vertical position and the container C, being lowered from overhead, must be properly aligned with the vehicle bed and with the bolsters on the bed to assure that, when lowered, the corners of the container are properly received by the retaining flange 15b and the raised side plate 19. With this accomplished, the container of course is restrained against movement both longitudinally and transversely of the vehicle bed, and the weight of the container is sufficient to keep it resting on the supporting surfaces 15a of the bolsters.

Figure 5:
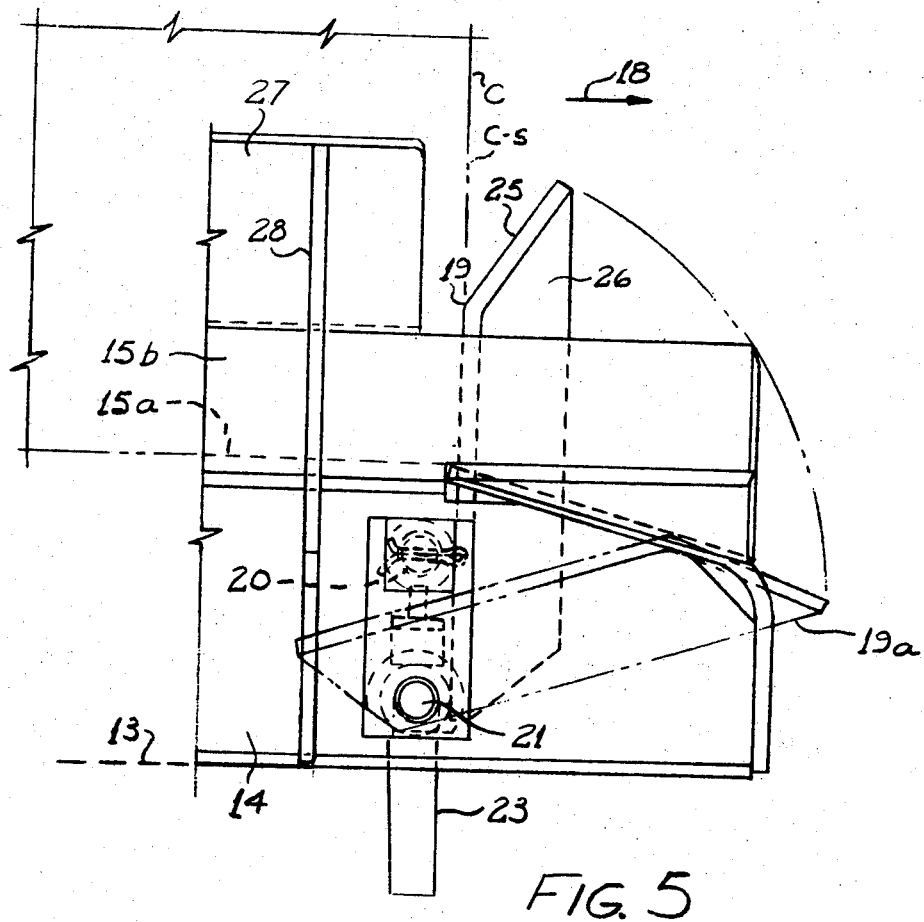
FIG. 5 is a fragmentary view, similar to FIG. 1, but showing the side plate in its lowered position.

Accordingly, the invention provides the side plate 19 with an upper portion 25 which is angularly disposed with respect to the vertical side plate and is slanted upwardly and laterally outwardly, as is best shown in FIGS. 1 and 5. Conveniently, the side plate 19 with its upper portion 25 may be reinforced by suitable gussets as indicated at 26. The plate 19 is referred to as the side plate since it is disposed adjacent the side C-s of the container C.

In addition, the invention provides an end plate 27 which is disposed adjacent the end C-e of the container above the retainer flange 15b so that the lower edge of the plate 27 and the upper edge of the flange 15b are substantially contiguous. The end plate 27 is supported by gussets 28 which are secured to one of the channels 14 of the bolster 12 and possibly also to the flange 15b, as will be apparent from FIGS. 3 and 5, as well as from FIG. 4. The end plate 27 is angularly disposed with respect to the vertical flange 15b and is slanted upwardly and longitudinally outwardly, as shown.

Thus, the angularly disposed side plate portion 25 and the angularly disposed end plate 27 provide downwardly and inwardly slanting guides by which the corner portions of a container C, being lowered toward the vehicle bed 13, are effectively guided and stabilized during overhead loading, so that these corner portions of the container are properly received within the confines of the retaining flange 15b and side plate 19 when the container ultimately rests on the supporting surface 15a of the bolster 12.

While in the foregoing there has been described and shown the preferred embodiment of the invention, various modifications and equivalents may be resorted to within the spirit and scope of the invention as claimed.

What is claimed as new is:

1. A retainer and guide assembly for a rectangular shipping container on a flat vehicle bed, said assembly comprising in combination a horizontally elongated bolster adapted to be secured transversely to a vehicle bed, said bolster comprising a pair of spaced parallel channel members having their open sides facing outwardly from each other, an angle bar having a horizontal flange spanning the space between and secured to upper flanges of said channel members and also having a vertical flange projecting upwardly from one side edge of said horizontal flange in vertical alignment with the outside edge of the upper flange of one of said channel members, the horizontal flange of said angle bar constituting a supporting surface for the bottom of a container being shipped, while the vertical flange of the angle bar constitutes abutment means for an end of the container, said channel members being of a length greater than said angle bar so that the channel members project beyond the angle bar at both ends of the latter, a pair of vertical plates mounted transversely between said channel members at the ends of the angle bar, said vertical plates projecting above the vertical flange of the angle bar and constituting abutment means for opposite sides of the container, upwardly and outwardly sloping portions provided integrally at the upper ends of said vertical plates and constituting guides for guiding a container between the vertical plates while the container is being lowered into shipping position, vertically elongated reinforcing gussets secured exteriorly to said vertical plates to said sloping portions thereof, at least one upwardly and outwardly sloping guide plate provided at the upper edge of the vertical flange of said angle bar for guiding the container during lowering thereof into shipping position against said vertical flange, and a vertically elongated reinforcing gusset secured exteriorly to said vertical flange, to the associated of said channel members and to said guide plate.

* * * * *